Sept. 20, 1960 G. E. LYNN ET AL 2,953,751

MAGNETIC AMPLIFIER SYSTEMS

Filed Aug. 13, 1957

WITNESSES
Edwin E. Bassler
Myron E. Click

INVENTORS
Gordon E. Lynn &
John F. Ringelman
BY
F. E. Browder
ATTORNEY 2,953,751
Patented Sept. 20, 1960

2,953,751

MAGNETIC AMPLIFIER SYSTEMS

Gordon E. Lynn, Severna Park, and John F. Ringelman, Catonsville, Md., assignors to Westinghouse Electric Corporation, East Pittsburgh, Pa., a corporation of Pennsylvania Filed Aug. 13, 1957, Ser. No. 677,988

6 Claims. (Cl. 330—8)

This invention relates to cascaded magnetic amplifier systems in general, and in particular to apparatus for coupling two or more stages of alternating current signal, fast-responsive magnetic amplifiers.

Recently developed techniques have made possible the use of magnetic amplifiers as true alternating-current signal amplifiers, producing a reproduction of the input signal at the output terminals. This is in contrast to amplifiers in which the output is a direct-current voltage, the amplitude of which is proportional to the amplitude of an alternating-current signal. The use of these recently developed techniques has made it possible to reduce the effects of environmental sensitivity in single-stage magnetic amplifiers and, hence, to amplify smaller amplitude signals than it had been possible to amplify using the more familiar direct-current amplifier techniques. When the signal frequency is greater than one-tenth the amplifier supply frequency, it is necessary in utilizing these techniques to resort to fast-response, half-wave magnetic amplifiers to avoid excessive signal attenuation and phase-shift.

In attempting to cascade this type of alternating-current magnetic amplifier, however, the usefulness of the technique is limited since the output of the first stage due to its environmental sensitivity tends to cause a shift in the bias point of the second stage. This occurs because, although the direct-current component may be blocked from the second stage, the alternating-current component of the first stage output, at zero signal, alters the resetting of the second stage magnetic cores when both stages are operated at the same supply frequency. Thus, although no signal voltage is visible in the output of the second stage, the second stage magnetic cores are limited in their ability to accept an amplified signal from the first stage. Essentially, the second stage tends to act as a clipper, the amount of the clipping action depending upon the amount of drift in the first stage and its relation to the amplified signal amplitude. In addition to the clipping action, the change in bias point may result in drift of the second stage output level, which, if some types of demodulators are being used as loads, may appear as a signal in the output of the demodulator.

It is an object of this invention to provide coupling apparatus for magnetic amplifiers.

It is another object of this invention to provide coupling apparatus for alternating-current magnetic amplifiers that eliminates the bias shift due to environmental sensitivity of the first stage and the resulting clipping and the change of output of a succeeding stage.

It is a further object of this invention to provide coupling apparatus for cascading alternating-current magnetic amplifier stages so that the maximum alternating-current signal to the first stage will just drive the last stage from cut-off to full-on, yielding maximum efficiency.

Further objects of this invention will become apparent from the following description when taken in conjunction with the accompanying drawing. In said drawing, for illustrative purposes only, is shown a preferred form of the invention.

Figure 1:
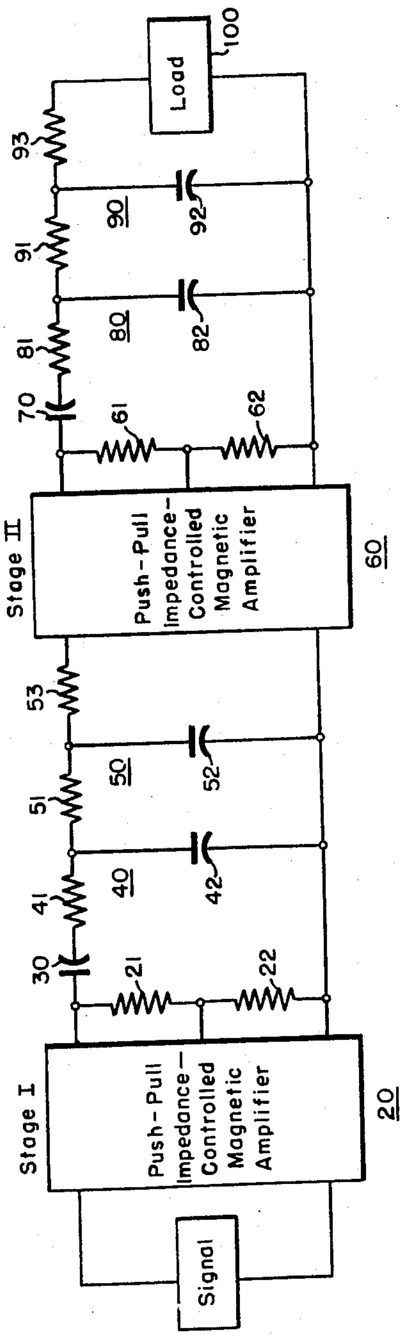
Figure 1 is a schematic diagram of coupling apparatus embodying the teachings of this invention.

Referring to Fig. 1, there is illustrated apparatus coupling two stages of alternating-current magnetic amplifiers and coupling a second stage to a load.

In Fig. 1, stage I and II magnetic amplifiers may be push-pull, impedance-controlled magnetic amplifiers of a type described in an abandoned copending application S.N. 652,540, entitled "Magnetic Amplifiers," filed April 12, 1957, assigned to the assignee of the present invention. In brief, these magnetic amplifiers are of the type making use of self-saturation. In such magnetic amplifiers there is provided at least one saturable magnetic core member having wound thereon a control winding and a load winding. First and second alternating voltages of the same phase and frequency are coupled to these windings by means of rectifiers which are poled so that on first alternating half cycles of the alternating voltages, the first alternating voltage is applied to the load winding to drive the magnetization level of the core towards saturation, and on second alternate half cycles of the alternating voltages, the second alternating voltage is applied to the control winding to "reset" or withdraw the magnetization level of the core from saturation. A saturable inductive device is connected in series with the second alternating voltage source and the control winding to control the magnetization level set by the control winding on reset half cycles of operation. After the saturable core has become saturated during the half cycle of voltage application to the load winding, the impedance presented thereby will drop from a very high value to a very low value, and the voltage across the load impedance connected in series with the load winding will sharply rise to substantially the same voltage as that of the first alternating voltage source. The time integral of the voltage developed across the load impedance, therefore, will be determined by the magnetization level set in the core during the half cycle of voltage application to the control windings by the second alternating voltage source. Inasmuch as this magnetization level is functionally related to the control saturable inductive device in series with the control windings, the time integral of the voltage developed across the load impedance will be functionally related to the impedance of the aforesaid control saturable inductive device. For a more detailed description of the construction and operation of this type of magnetic amplifier, reference is made to the aforementioned copending application S.N. 652,540.

Figure 3:
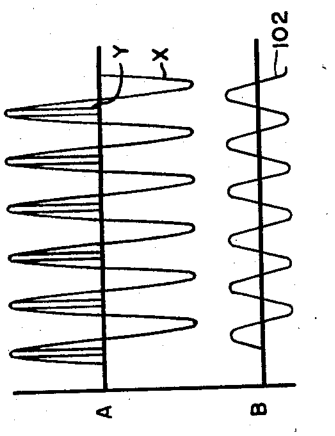
Fig. 3 is a graphical representation of waveforms present at selected points of the apparatus illustrated in Fig. 1 under conditions of no signal input but an output from stage I due to environmental sensitivity.
Figure 2:
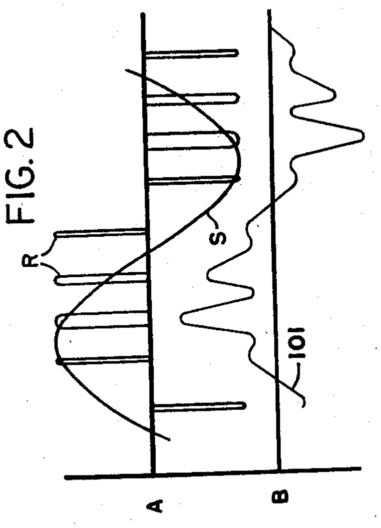
Fig. 2 is a graphical representation of waveforms present at various points of the apparatus in Fig. 1 under signal input conditions.

The output of the stage I magnetic amplifier 20 will appear across the resistors 21 and 22. When a signal is applied as shown in Fig. 1, the output across the resistors 21 and 22 is as graphically represented in graph A of Fig. 2. The curve S represents the applied signal voltage and the curves R represent the output across the resistors 21 and 22. The output illustrated in graph A of Fig. 2 occurs in the absence of environmental changes. The approximate wave shape appearing across capacitor 52 in the presence of a signal is shown by curve 101 of graph B of Fig. 2. With a zero signal applied to the stage I magnetic amplifier 20, but in the presence of environmental changes, the output is as shown in graph A of Fig. 3. The curve X represents the supply voltage and curve Y represents the output due to environmental sensitivity. Curve 102 of graph B of Fig. 3 represents the approximate wave shape appearing across capacitor 52 in the absence of a signal but in the presence of output from stage I due to environmental sensitivity.

The usual purpose of using such an alternating-current magnetic amplifier is to obtain amplification of a small alternating-current signal, the resulting useful output in a typical application being of the same order of magnitude as the direct-current output due to environmental sensitivity of the magnetic amplifier. If the output were applied directly to a second stage of amplification, the output due to environmental changes would be amplified along with the signal. For this reason, a blocking capacitor 30 is connected in series with the output of stage I and will eliminate the direct-current component of the output due to environmental sensitivity. An alternating component of the output due to environmental sensitivity remains, however, with a frequency identical with the amplifier supply frequency. An amplifier such as is used in this application will respond to a voltage of a frequency identical to its own supply frequency. For this reason, the alternating-current component of output due to environmental sensitivity of the first stage would result in a bias shift in the second stage. If this bias shift were of sufficient magnitude, a signal superimposed on the output due to environmental changes would be clipped on either its positive or negative half cycle. For maximum efficiency it would be desirable that, when a maximum signal is applied to stage I, the amplified signal voltage from stage I would drive stage II from cut-off to full-on. If this condition is satisfied, then any bias shift caused by output due to environmental sensitivity of stage I would result in some clipping of one half cycle of the amplified signal voltage.

To eliminate the bias shift stage I and stage II may be coupled by a low pass filter, the cut-off frequency of which lies between the signal frequency and the amplifier supply frequency. However, complete attenuation of the amplitude of the amplifier supply frequency to negligible levels requires either a large number of additional components, and results in excessive attenuation and phase shift of the signal frequency, or use of a filter in which the performance is extremely critical with respect to the values of inductance or capacitance used, making it difficult to obtain the desired performance over a reasonable ambient temperature range.

In the apparatus illustrated in Fig. 1, stage I is coupled to stage II through two stages of a simple resistor-capacitor filter to effect a 90° phase shift of the output component at the amplifier supply frequency. The resistor-capacitor filters 40 and 50, shown in Fig. 1, comprise resistors 41 and 51, 53, respectively, connected in series with the output from stage I and capacitors 42 and 52 connected in parallel with the output of stage I, respectively.

If the filters 40 and 50 both have a cut-off frequency, or a frequency of maximum attenuation, at the stage I amplifier 20 supply frequency, the filters 50 and 40 do not attenuate the signal frequency at all and result in only a substantially small phase shift of the signal. When a signal voltage of a frequency identical with the amplifier supply frequency is applied to the control circuit of a magnetic amplifier, the effectiveness of the signal voltage in achieving reset of the amplifier is a function of the phase relationship between the signal voltage applied to the control circuit and the amplifier supply voltage applied to the load circuit. If the two voltages have a quadrature relationship with respect to each other, the net reset on the magnetic amplifier core due to control circuit voltage is zero. Thus, use of the coupling capacitor 30 in series with their filters 40 and 50 across the output of the stage I magnetic amplifier will eliminate all reset in the stage II as a result of output of stage I at the supply frequency due to the environmental sensitivity, regardless of the magnitude of such output.

If the output stage of stage II is to be coupled to a load 100 wherein drift of stage II will affect the maximum efficiency, a coupling apparatus similar to the apparatus coupling the stages I and II hereinbefore described may be used. As is shown in Fig. 1, assuming the output of the stage II magnetic amplifier 60 to be taken across the resistors 61 and 62, there is connected a coupling capacitor 70 in series with and the filters 80 and 90 across the output of stage II. The filters 80 and 90 comprise the resistors 81 and 91, 93, respectively, connected in series with, and the capacitors 82 and 92 connected in parallel with, respectively, the output of the stage II magnetic amplifier 60.

In conclusion, it is pointed out that while the illustrated example constitutes a practical embodiment of our invention, we do not limit ourselves to the exact details shown, since modification of the same may be varied without departing from the spirit of the invention.

We claim as our invention:

1. A magnetic amplifier system comprising, a pair of cascaded alternating-current signal magnetic amplifiers, both of said magnetic amplifiers having the same alternating current supply frequency, the frequency of the signal to be amplified being substantially smaller than said supply frequency, capacitor means coupling the output of a first magnetic amplifier to the input of a succeeding magnetic amplifier for blocking a direct-current component of output due to environmental sensitivity of said first magnetic amplifier, and filter means coupling the output of a first magnetic amplifier to the input of a succeeding magnetic amplifier for shifting the phase of a supply frequency alternating-current component of output due to environmental sensitivity of said first magnetic amplifier substantially 90° out of phase with respect to the alternating-current supply of said succeeding cascaded magnetic amplifier, said filter means passing the component of signal frequency without substantial alteration.

2. A magnetic amplifier system comprising, in combination, a pair of cascaded alternating current signal magnetic amplifiers, both of said magnetic amplifiers having the same alternating current supply frequency, the frequency of the signal to be amplified being substantially smaller than said supply frequency, and means for coupling the output of a first magnetic amplifier of said pair to the input of a succeeding magnetic amplifier and including capacitor means for blocking a direct current component of output of the first magnetic amplifier due to environmental sensitivity from reaching said succeeding magnetic amplifier, said coupling means including filter means for shifting the phase of a supply frequency alternating current component of output of the first magnetic amplifier due to environmental sensitivity substantially 90° out of phase with respect to the alternating current supply of the succeeding magnetic amplifier, said filter means passing the component of signal frequency without substantial alteration.

3. A magnetic amplifier system comprising, in combination, a pair of cascaded alternating current signal magnetic amplifiers, both of said magnetic amplifiers having the same alternating current supply frequency, the frequency of the signal to be amplified being substantially smaller than said supply frequency, and coupling means including capacitor means coupling the output of a first magnetic amplifier of said pair to the input of a succeeding magnetic amplifier, said capacitor means blocking a direct current component of output of the first magnetic amplifier due to environmental sensitivity from reaching the input of the succeeding magnetic amplifier, said coupling means including phase shifting means for shifting the phase of a supply frequency alternating component of output of the first magnetic amplifier due to environmental sensitivity substantially 90° out of phase with respect to the alternating current supply of the succeeding magnetic amplifier, said phase shifting means passing the component of signal frequency without substantial alteration.

4. In a magnetic amplifier system, in combination, first and second cascaded alternating current signal magnetic amplifiers, said first and second magnetic amplifiers having the same alternating current supply frequency, the frequency of the signal to be amplified being substantially smaller than said supply frequency, the first magnetic amplifier with no signal to be amplified applied thereto having a no-signal output due to changes in the control characteristics thereof as a result of environmental sensitivity, said no-signal output having only direct current and supply frequency components, and coupling means for coupling the output of the first magnetic amplifier to the input of the second magnetic amplifier, said coupling means including capacitor means for blocking the direct current component of the no-signal output of the first amplifier, said coupling means including filter means for shifting the phase of the supply frequency component in the no-signal output of the first magnetic amplifier substantially 90° out of phase with respect to the alternating current supply of said second magnetic amplifier whereby said supply frequency component is rendered ineffective to change the bias point of the second magnetic amplifier, said filter means passing the component of signal frequency without substantial alteration.

5. In a magnetic amplifier system, in combination, first and second cascaded alternating current signal magnetic amplifiers, said first and second magnetic amplifiers having the same alternating current supply frequency, the frequency of the signal to be amplified being substantially smaller than said supply frequency, said first magnetic amplifier with no signal to be amplified applied to the input thereof having developed therein a steady state output due to environmental sensitivity, said no-signal steady state output having only direct current and supply frequency components, and coupling means connecting the output of the first magnetic amplifier to the input of the second magnetic amplifier, said coupling means including capacitor means for blocking the direct current component of the no-signal output of the first magnetic amplifier, said coupling means including filter means having the frequency of maximum attenuation above the signal frequency and below the supply frequency, said filter means shifting the phase of the supply frequency component of the no-signal output of the first magnetic amplifier 90° out of phase with respect to the alternating current supply of the second magnetic amplifier whereby the supply frequency component of the no-signal output of the first magnetic amplifier is rendered ineffective to change the bias point of the second magnetic amplifier, said filter means passing the component of signal frequency without substantial alteration.

6. In a magnetic amplifier system, in combination, first and second cascaded alternating current signal magnetic amplifiers, said first and second magnetic amplifiers having the same alternating current supply frequency, the frequency of the signal to be amplified being substantially smaller than said supply frequency, said first magnetic amplifier with no signal to be amplified applied thereto having developed therein a steady state output due to environmental sensitivity, said steady state output having only direct current and supply frequency components, and coupling means connecting the output of the first magnetic amplifier to the input of the second magnetic amplifier, said coupling means comprising a resistance-capacitance network, said resistance-capacitance network including a capacitor which blocks the direct current component in the output of the first magnetic amplifier, said resistance-capacitance network being arranged to provide a filter circuit and a phase-shifting circuit for shifting the phase of the supply frequency component in the no-signal output of the first magnetic amplifier 90° with respect to the alternating current supply of the second magnetic amplifier to thereby render the supply frequency component of the steady state no-signal output of the first magnetic amplifier ineffective to change the bias point of the second magnetic amplifier, said resistance-capacitance network passing the component of signal frequency without substantial alteration.

References Cited in the file of this patent

UNITED STATES PATENTS

| | | |
|---|---|---|
| 2,561,329 | Ahlen | July 24, 1951 |
| 2,668,238 | Frink | Feb. 2, 1954 |
| 2,677,097 | Carleton | Apr. 27, 1954 |